(12) United States Patent
Kawaguchi et al.

(10) Patent No.: US 7,901,315 B2
(45) Date of Patent: Mar. 8, 2011

(54) AUTOMATIC TRANSMISSION AND METHOD OF PREVENTING OVER-REVOLUTION OF THE SAME

(75) Inventors: Takateru Kawaguchi, Shizuoka (JP); Shinya Mochiyama, Shizuoka (JP); Fumitaka Nagashima, Shizuoka (JP); Yoshihide Shinso, Shizuoka (JP)

(73) Assignee: JATCO Ltd, Fuji-shi (JP)

( * ) Notice: Subject to any disclaimer, the term of this patent is extended or adjusted under 35 U.S.C. 154(b) by 510 days.

(21) Appl. No.: 12/029,632

(22) Filed: Feb. 12, 2008

(65) Prior Publication Data

US 2008/0227580 A1 Sep. 18, 2008

(30) Foreign Application Priority Data

Mar. 14, 2007 (JP) ................................. 2007-065207

(51) Int. Cl.
*F16H 31/00* (2006.01)
(52) U.S. Cl. ........................................ 475/118; 475/122
(58) Field of Classification Search .................. 475/118, 475/119, 121, 122, 123
See application file for complete search history.

(56) References Cited

U.S. PATENT DOCUMENTS

| | | | |
|---|---|---|---|
| 4,785,689 A | 11/1988 | Iwatsuki et al. | |
| 4,843,551 A | 6/1989 | Milunas | |
| 5,016,174 A | 5/1991 | Ito et al. | |
| 5,033,328 A | 7/1991 | Shimanaka | |
| 5,060,540 A | 10/1991 | Yamaguchi | |
| 5,113,725 A | 5/1992 | Tomomatsu et al. | |
| 5,233,890 A | 8/1993 | Aldrich, III et al. | |
| 5,439,427 A | 8/1995 | Enokido et al. | |
| 5,613,583 A | 3/1997 | Kono et al. | |
| 5,846,162 A | 12/1998 | Ito et al. | |
| 5,855,532 A | 1/1999 | Sugiyama | |
| 5,957,800 A | 9/1999 | Oba et al. | |
| 6,270,439 B1 * | 8/2001 | Suzuki | 475/127 |
| 6,309,324 B1 | 10/2001 | Sawa et al. | |
| 6,319,164 B1 * | 11/2001 | Runde et al. | 475/116 |
| 6,357,289 B1 | 3/2002 | Futawatari | |
| 6,440,040 B1 | 8/2002 | Amano et al. | |
| 6,520,881 B1 * | 2/2003 | Long et al. | 475/119 |

(Continued)

FOREIGN PATENT DOCUMENTS

DE 100 38 144 A1 4/2001

(Continued)

OTHER PUBLICATIONS

T. Kawaguchi, U.S. PTO Office Action, U.S. Appl. No. 11/962,469, dated Jul. 6, 2010, 14 pages.

(Continued)

*Primary Examiner* — Ha D. Ho
(74) *Attorney, Agent, or Firm* — Foley & Lardner LLP

(57) ABSTRACT

An automatic transmission includes a plurality of planetary gears disposed between an input shaft and an output shaft and having a plurality of rotational elements. A plurality of frictional elements are selectively engaged and released for controlling rotations and connections of the plurality of rotational elements in accordance with instructions so as to realize a plurality of gear positions. A rotational speed detecting section detects a rotational speed of a predetermined one of the plurality of rotational elements other than the input shaft and the output shaft. A frictional element release section releases all of the plurality of frictional elements when it is judged that the rotational speed of the predetermined one of the plurality of rotational elements is higher than a predetermined rotational speed.

12 Claims, 8 Drawing Sheets

U.S. PATENT DOCUMENTS

| | | | |
|---|---|---|---|
| 7,140,993 B2 * | 11/2006 | Long et al. | 475/119 |
| 7,402,123 B2 | 7/2008 | Kobayashi et al. | |
| 7,419,452 B2 | 9/2008 | Nozaki et al. | |
| 7,682,275 B2 | 3/2010 | Yoneyama | |
| 2006/0040791 A1 | 2/2006 | Nakajima et al. | |
| 2007/0015624 A1 | 1/2007 | Ota et al. | |
| 2008/0064568 A1 | 3/2008 | Kawaguchi et al. | |
| 2008/0113848 A1 | 5/2008 | Inoue et al. | |
| 2008/0153655 A1 | 6/2008 | Kawaguchi et al. | |
| 2008/0167155 A1 | 7/2008 | Kawaguchi et al. | |
| 2008/0176706 A1 | 7/2008 | Wu et al. | |
| 2008/0221764 A1 | 9/2008 | Nagashima et al. | |

FOREIGN PATENT DOCUMENTS

| | | |
|---|---|---|
| JP | 1-172660 A | 7/1989 |
| JP | 2-304262 A | 12/1990 |
| JP | 3-113161 A | 5/1991 |
| JP | 04-015359 A | 1/1992 |
| JP | 05-288264 A | 11/1993 |
| JP | 5-346160 A | 12/1993 |
| JP | 6-109129 A | 4/1994 |
| JP | 8-219274 A | 8/1996 |
| JP | 09-089098 | 3/1997 |
| JP | 09-089098 A | 3/1997 |
| JP | 09-317871 A | 12/1997 |
| JP | 11-280896 A | 10/1999 |
| JP | 11-280898 A | 10/1999 |
| JP | 2000-240785 A | 9/2000 |
| JP | 2003-097691 A | 4/2003 |
| JP | 2004-068989 A | 3/2004 |

OTHER PUBLICATIONS

English translation of JP 06-109129 previously submitted in an IDS dated Apr. 14, 2009, 14 pages.

U.S. Appl. No. 11/962,469, filed Dec. 21, 2007, Kawaguchi et al.

T. Kawaguchi, U.S. PTO Notice of Allowance, U.S. Appl. No. 11/946,483, dated Aug. 26, 2010, 21 pages.

T. Kawaguchi, U.S. PTO Notice of Allowance, U.S. Appl. No. 11/853,181, dated Sep. 23, 2010, 10 pages.

T. Kawaguchi, U.S. PTO Final Office Action, U.S. Appl. No. 11/962,469, dated Dec. 7, 2010, 8 pages.

* cited by examiner

FIG.3

|  | B1<br>Fr/B | C1<br>I/C | C2<br>D/C | C3<br>H&LR/C | B2<br>LOW/B | B3<br>2346/B | B4<br>R/B | F1 | F2 |
|---|---|---|---|---|---|---|---|---|---|
| 1ST | (○) |  |  | (○) | ○ |  |  | ○ | ○ |
| 2ND |  |  |  | (○) | ○ | ○ |  |  | ○ |
| 3RD |  |  | ○ |  | ○ | ○ |  |  |  |
| 4TH |  |  | ○ | ○ |  | ○ |  |  |  |
| 5TH |  | ○ | ○ | ○ |  |  |  |  |  |
| 6TH |  | ○ |  | ○ |  | ○ |  |  |  |
| 7TH | ○ | ○ |  | ○ |  |  |  | ○ |  |
| REV | ○ |  |  | ○ |  |  | ○ |  |  |

AUTOMATIC TRANSMISSION AND METHOD OF PREVENTING OVER-REVOLUTION OF THE SAME

BACKGROUND OF THE INVENTION

The present invention relates to a control for preventing over-revolution of rotational elements in a multi-speed automatic transmission. More specifically, the present invention relates to an automatic transmission adapted to prevent such over-revolution and a method for carrying out such a control.

There is disclosed in Unexamined Japanese Patent Publication No. 9-89098 a technique for preventing, when increase of an engine speed beyond a predetermined value occurs in a vehicle having installed thereon an automatic transmission, further increase of the engine speed by upshifting for thereby protecting the engine against damage.

SUMMARY OF THE INVENTION

In the event of a malfunction of an automatic transmission frictional element, particularly, a release malfunction of the same, there may occur such a case where a rotational element other than an input shaft is increased in speed in accordance with a tooth ratio of a planetary gear set so as to rotate at very high speed though an input rotational speed is not so high.

Thus, it is considered to give a sufficient strength for enduring an estimated speed to the rotational element assumed to rotate at high speed in case of a malfunction of the frictional element. However, increase in the strength of the rotational element results in increase in the overall weight and the size of the automatic transmission.

It is accordingly an object of the present invention to provide an automatic transmission adapted to prevent rotational speeds of rotational elements from increasing beyond a predetermined value even in case of a malfunction of some frictional element for thereby assuring protection of the transmission against damage without increasing the weight and size.

It is a further object of the present invention to provide a method of preventing over-revolution of an automatic transmission.

To achieve the above object, there is provided according to an aspect of the present invention an automatic transmission comprising a plurality of planetary gears disposed between an input shaft and an output shaft and having a plurality of rotational elements, a plurality of frictional elements selectively engaged and released for controlling rotations and connections of the plurality of rotational elements, a controller for controlling engagement and release of the plurality of frictional elements in accordance with instructions so as to realize a plurality of gear positions, the controller including a rotational speed detecting section for detecting a rotational speed of a predetermined one of the plurality of rotational elements, other than the input shaft and the output shaft, and a frictional element release section for releasing all of the frictional elements when it is judged that the rotational speed of the predetermined one of the plurality of rotational elements is higher than a predetermined rotational speed.

According to another aspect of the present invention, there is provided an automatic transmission comprising a plurality of planetary gears disposed between an input shaft and an output shaft and having a plurality of rotational elements, a plurality of frictional elements selectively engaged and released for controlling rotations and connections of the plurality of rotational elements in accordance with instructions so as to realize a plurality of gear positions, rotational speed detecting means for detecting a rotational speed of a predetermined one of the plurality of rotational elements, other than the input shaft and the output shaft, and frictional element release means for releasing all of the plurality of frictional elements when it is judged that the rotational speed of the predetermined one of the plurality of rotational elements is higher than a predetermined speed.

According to a further aspect of the present invention, there is provided a method for preventing over-revolution of an automatic transmission including a plurality of planetary gears disposed between an input shaft and an output shaft and having a plurality of rotational elements, and a plurality of frictional elements selectively engaged and released for controlling rotations and connections of the plurality of rotational elements in accordance with instructions so as to realize a plurality of gear positions, the method comprising detecting a rotational speed of a predetermined one of the plurality of rotational elements, other than the input shaft and the output shaft, and releasing all of the plurality of frictional elements when it is judged that the rotational speed of the predetermined one of the plurality of rotational elements is higher than a predetermined rotational speed.

BRIEF DESCRIPTION OF THE DRAWINGS

FIG. 3 is a table showing engagement states of clutches and brakes (i.e., frictional elements) for respective gear positions;

DESCRIPTION OF THE PREFERRED EMBODIMENTS

Figure 1:
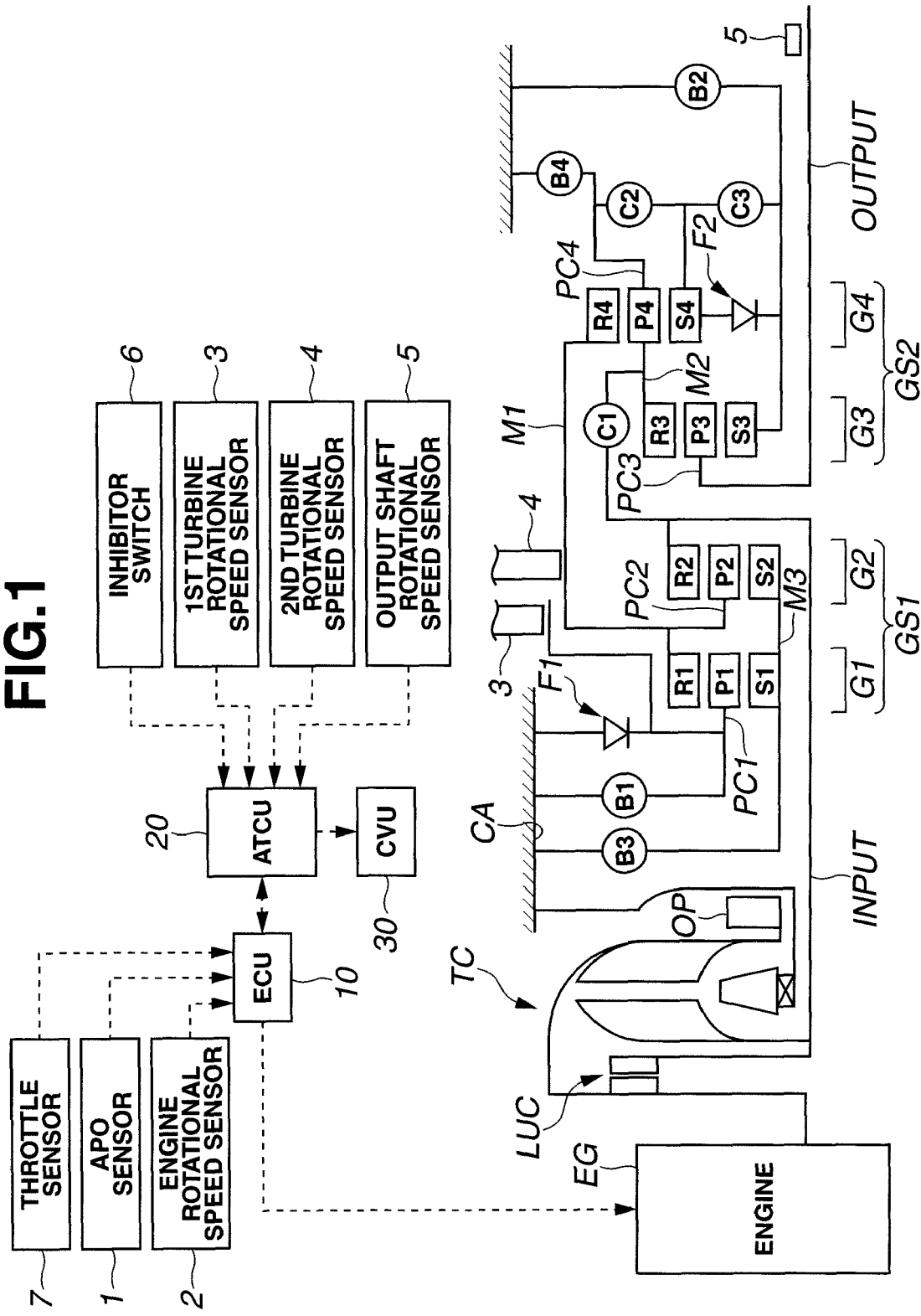
FIG. 1 is a skeleton view of an automatic transmission according to a first embodiment of the present invention.

Referring first to FIG. 1, an automatic transmission according to a first embodiment is a stepped automatic transmission that provides seven forward speeds and one rearward speed. The driving force of an engine EG is supplied to an input shaft INPUT of the transmission by way of a torque converter TC and outputted from an output shaft OUTPUT after subjected to a change in speed by means of four planetary gears and nine frictional elements. Further, an oil pump OP is disposed coaxially with an pump impeller of the torque converter TC and driven to rotate by means of an engine EG to pressurize oil.

Further, there are provided an engine control unit (ECU) 10 for controlling an operating condition of the engine EG, an automatic transmission control unit (ATCU) 20 for controlling a shift state and so on of the automatic transmission, and a control valve unit (CVU) for controlling an oil pressure for each frictional element on the basis of an output signal of the ATCU 20. In the meantime, the ECU 10 and ATCU 20 are connected with each other by way of a CAN communication line or the like so as to hold a sensor information and control information in common by communication.

To the ECU 10 are connected an APO sensor 1 for detecting the amount of accelerator pedal operation by a driver, an engine rotational speed sensor 2 for detecting an engine speed, and a throttle sensor 7 for detecting a throttle opening degree. The ECU 10 controls a fuel injection amount and a throttle opening degree on the basis of the engine speed and the amount of accelerator pedal operation for thereby controlling a speed and a torque of the engine EG.

To the ATCU 20 are connected a first turbine speed sensor (first rotational speed sensor) 3 for detecting a speed of a first carrier PC1, a second turbine speed sensor (second rotational speed sensor) 4 for detecting a speed of a first ring gear R1 and an inhibiter switch 6 for detecting a sate of shift lever operation by a driver. In a D range, the ATCU 20 selects an optimal gear position based on a vehicle speed $V_{SP}$ and the amount APO of accelerator pedal operation and outputs an instruction for attaining the optimal gear position to the control valve unit CVU. Further, the ATCU 20 calculates a rotational speed of the input shaft INPUT based on detection values of the first turbine speed sensor 3 and the second turbine speed sensor 4. The method for calculating the rotational speed of the input shaft INPUT will be described hereinlater.

Then, description will be made to a gear shift mechanism for transmitting rotation of the input shaft INPUT to the output shaft OUTPUT while changing its rotational speed. In the gear shift mechanism are disposed in the order from the input shaft INPUT side to the output shaft OUTPUT side a first planetary gear set GS1 and a second planetary gear set GS2. Further, there are disposed a plurality of clutches C1, C2 and C3, a plurality of brakes B1, B2, B3 and B4, and a plurality of one-way clutches F1 and F2 to serve as the above-described frictional elements.

The first planetary gear set GS1 consists of a first planetary gear G1 and a second planetary gear G2. The first planetary gear G1 is a single pinion type planetary gear including a first sun gear S1, a first ring gear R1, a first carrier PC1 supporting a first pinion P1 meshed with the both gears S1 and R1. The second planetary gear G2 is a single pinion type planetary gear including a second sun gear S2, a second ring gear R2 and a second carrier PC2 supporting a second pinion P2 meshed with the both gear S2 and R2. The second planetary gear set GS2 consists of a third planetary gear G3 and a fourth planetary gear 4. The third planetary gear G3 is a single pinion type planetary gear including a third sun gear S3, a third ring gear R3 and a third carrier PC3 supporting a third pinion P3 meshed with the both gears S3 and R3. The fourth planetary gear G4 is a single pinion type planetary gear including a fourth sun gear S4, a fourth ring gear R4 and a fourth carrier PC4 supporting a fourth pinion P4 meshed with the both gears S4 and R4.

The input shaft INPUT is connected to the second ring gear R2 and receives a driving force from the engine EG by way of the torque converter TC. The output shaft OUTPUT is connected to the third carrier PC3 and outputs a driving force to driving wheels by way of a final gear and so on.

A first connecting member M1 is a member that integrally connects the first ring gear R1, the second carrier PC2 and the fourth ring gear R4. A second connecting member M2 is a member that integrally connects the third ring gear R3 and the fourth carrier PC4. A third connecting member M3 is a member that integrally connects the first sun gear S1 and the second sun gear S2.

The first planetary gear set GS1 is constructed so as to connect the first planetary gear G1 and the second planetary gear G2 by the first connecting member M1 and the third connecting member M3 and is thereby constituted by four rotational elements. Further, the second planetary gear set GS2 is constructed so as to connect the third planetary gear G3 and the fourth planetary gear G4 by the second connecting member M2 and is thereby constituted by five rotational elements.

In the first planetary gear set GS1, a torque is inputted from the input shaft INPUT to the second ring gear R2, and the inputted torque is outputted to the second planetary gear set GS2 by way of the first connecting member M1. In the second planetary gear set GS2, a torque is inputted from the input shaft INPUT directly to the second connecting member M2 and also to the fourth ring gear R4 by way of the first connecting member M1, and the inputted torque is outputted to the output shaft OUTPUT from the third carrier PC3.

The clutch C1 is an input clutch that selectively connects and disconnects between the third sun gear S3 and the fourth sun gear S4. The clutch C2 is a direct clutch that selectively connects and disconnects between the fourth sun gear S4 and the fourth carrier PC4.

The clutch C3 is an H & LR clutch that selectively connects and disconnects between the third sun gear S3 and the fourth sun gear S4. Further, between the third sun gear S3 and the fourth sun gear S4 is disposed a second one-way clutch F2. By this, when the H & LR clutch C3 is released and the speed of the fourth sun gear S4 is larger than that of the third sun gear S3, the third sun gear S3 and the fourth sun gear S4 generate independent speeds. Thus, the third planetary gear G3 and the fourth planetary gear G4 are structured so as to be connected by way of the second connecting member M2 and attain respective gear ratios independently.

The brake B1 is a front brake for selectively stopping rotation of the first carrier PC1. Further, a first one-way clutch F1 is disposed in parallel with the front brake B1. The brake B2 is a low brake for selectively stopping rotation of the third sun gear S3. The brake B3 is a 2346 brake for selectively stopping rotation of the third connecting member M3 that connects the first sun gear S1 and the second sun gear S3. The brake B4 is a reverse brake for selectively stopping rotation of the fourth carrier PC4.

Herein, description will be made as to the method for calculating the turbine speed that is the rotational speed of the input shaft INPUT, which method is executed in the ATCU 20. The turbine speed is calculated by the following expression (1) based on the rotational speed of the first carrier PC1 that is a detection value of the first turbine speed sensor 3 and the rotational speed of the second carrier PC2 that is a detection value of the second turbine speed sensor 4.

$$N_{Input}=[(\lambda_1+\lambda_1\lambda_2+\lambda_2)/\lambda_1]N_{PC2}-[(\lambda_1\lambda_2+\lambda_2)/\lambda_1]N_{PC1} \quad (1)$$

$N_{Input}$, $N_{PC1}$, $N_{PC2}$, $\lambda_1$ and $\lambda_2$ indicate the rotational speed of the input shaft INPUT, the rotational speed of the first carrier PC1 and the rotational speed of the second carrier PC2, the tooth ratio of the planetary gear G1 and the tooth ratio of the planetary gear G2. The tooth ratios $\lambda_1$, $\lambda_2$ are the ratios between the numbers $Z_{R1}$, $Z_{R2}$ of teeth of the ring gears R1, R2 and the numbers $Z_{S1}$, $Z_{S2}$ of teeth of the sung gears S1, S2 as shown by the following expression (2).

$$\lambda_1=Z_{S1}/Z_{R1}, \lambda_2=Z_{S2}/Z_{R2} \quad (2)$$

Figure 2:
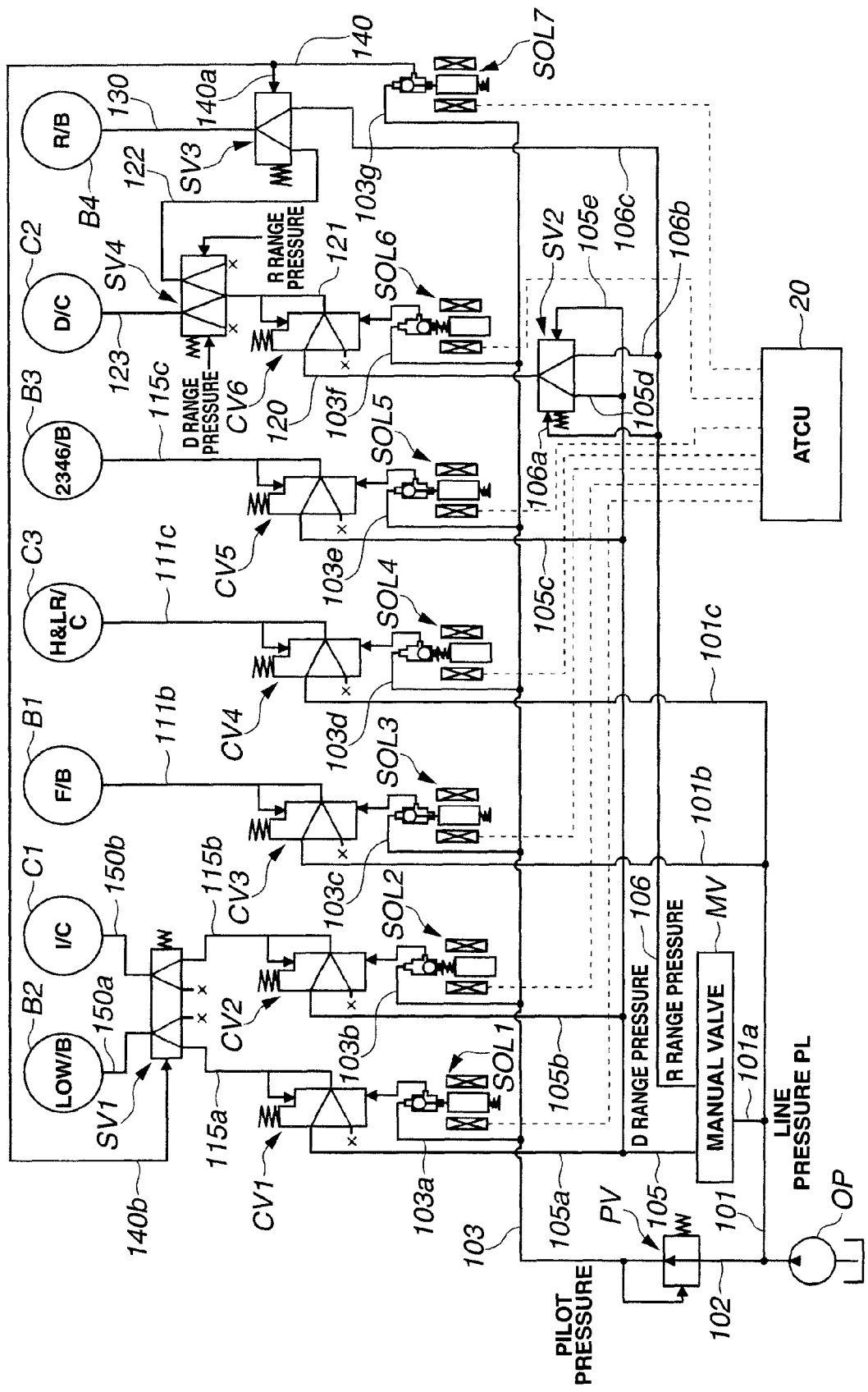
FIG. 2 is a diagram showing a hydraulic circuit for a control valve unit of the automatic transmission.

Then, with reference to FIG. 2, description will be made to the hydraulic circuit of the CVU 30. FIG. 2 is a circuit diagram depicting the hydraulic circuit of the CVU 30.

The hydraulic circuit is provided with an oil pump OP that is driven by the engine EG to serve as an oil pressure source, a manual valve MV for switching an oil passage for supplying a line pressure PL in response to a shift lever operation by a driver, and a pilot valve PV for reducing the line pressure PL to a predetermined pressure.

Further, there are provided a first pressure regulation valve CV1 for regulating the engagement pressure of the low brake B2, a second pressure regulation valve CV2 for regulating the engagement pressure of the input clutch C1, a third pressure regulation valve CV3 for regulating the engagement pressure of the front brake B1, a fourth pressure regulation valve CV4 for regulating the engagement pressure of the H & RL clutch C3, a fifth pressure regulation valve CV5 for regulating the engagement pressure of the 2346 brake B3, and a sixth pressure regulation valve CV6 for regulating the engagement pressure of the direct clutch C2.

Further, there are provided a first directional control valve SV1 for selectively communicating only one of the low brake B2 and the input clutch C1 with a corresponding oil supply passage, a second switch valve SV2 for selectively communicating only one of a D range pressure supply passage and an R range pressure supply passage with the direct clutch C2, a third directional control valve SV3 for switching the oil pressure to be supplied to the reverse brake B4 between the oil pressure supplied from the sixth pressure regulating valve CV6 and the R range pressure and a fourth directional control valve SV4 for switching a passage to which the pressure outputted from the sixth pressure-regulating valve CV6 is supplied between the oil passage 123 and the oil passage 122.

Further, there are provided a first solenoid valve SOL1 that outputs a pressure regulation signal to the first pressure regulation valve CV1, a second solenoid valve SOL2 that outputs a pressure regulation signal to the second pressure regulation valve CV2, a third solenoid valve SOL3 that outputs a pressure regulation signal to the third pressure regulation valve SOL3, a fourth solenoid valve SOL4 that outputs a pressure regulation signal to the fourth pressure regulation valve CV4, a fifth solenoid valve SOL5 that outputs a pressure regulation signal to the fifth pressure regulation valve CV5, a sixth solenoid valve SOL6 that outputs a pressure regulation signal to the sixth pressure regulation valve SOL6 and a seventh solenoid valve SOL7 that outputs a control signal to the first directional control valve SV1 and the third directional control valve SV3, on the basis of control signals from the ATCU 20.

The discharge pressure of the oil pump OP that is driven by the engine EG is regulated to the line pressure PL and thereafter supplied to oil passages 101 and 102. To the oil passage 101 are connected an oil passage 101a that is connected to the manual valve MV operated in relation to a shift lever operation by a vehicle driver, an oil passage 101b for supply of an original pressure for creating the engagement pressure of the front brake B1 and an oil passage 101c for supply of an original pressure for creating the engagement pressure of the H&LR clutch 3.

To the manual valve MV are connected an oil passage 105, and an oil passage 106 for supplying to the reverse brake B4 an R range pressure for selection of an R range at rearward running, one of the oil passages 105 and 106 being selectively communicated with the manual valve MV in response to a shift lever operation.

To the oil passage 105 are connected an oil passage 105a for supply of an original pressure for creating the engagement pressure of the low brake B2, an oil passage 105b for supply of an original pressure for creating the engagement pressure of the input clutch C1, an oil passage 105c for supply of an original pressure for creating the engagement pressure of the 2346 brake B3, an oil passage 105d for supply of an original pressure for creating the engagement pressure of the direct clutch C2 and an oil passage 105e for supply of a control pressure of the second directional control valve SV2.

To the oil passage 106 are connected an oil passage 106a for supply of the control pressure of the second directional control valve SV2, an oil passage 106b for supply of an original pressure for creating the engagement pressure of the direct clutch C2 and an oil passage 106c for supply of the engagement pressure of the reverse brake B4.

To the oil passage 102 is connected an oil passage 103 for supply of a pilot pressure by way of the pilot vale PV. The oil passage 103 is connected with an oil passage 103a for supplying the pilot pressure to the first solenoid valve SOL1, an oil passage 103b for supplying the pilot pressure to the second solenoid valve SOL2, an oil passage 103c for supplying the pilot pressure to the third solenoid valve SOL3, an oil passage 103d for supplying the pilot pressure to the fourth solenoid valve SOL4, an oil passage 103e for supplying the pilot pressure to the fifth solenoid valve SOL5, an oil passage 103f for supplying the pilot pressure to the sixth solenoid valve SOL6 and an oil passage 103g for supplying the pilot pressure to the seventh solenoid valve SOL7.

Figure 4:
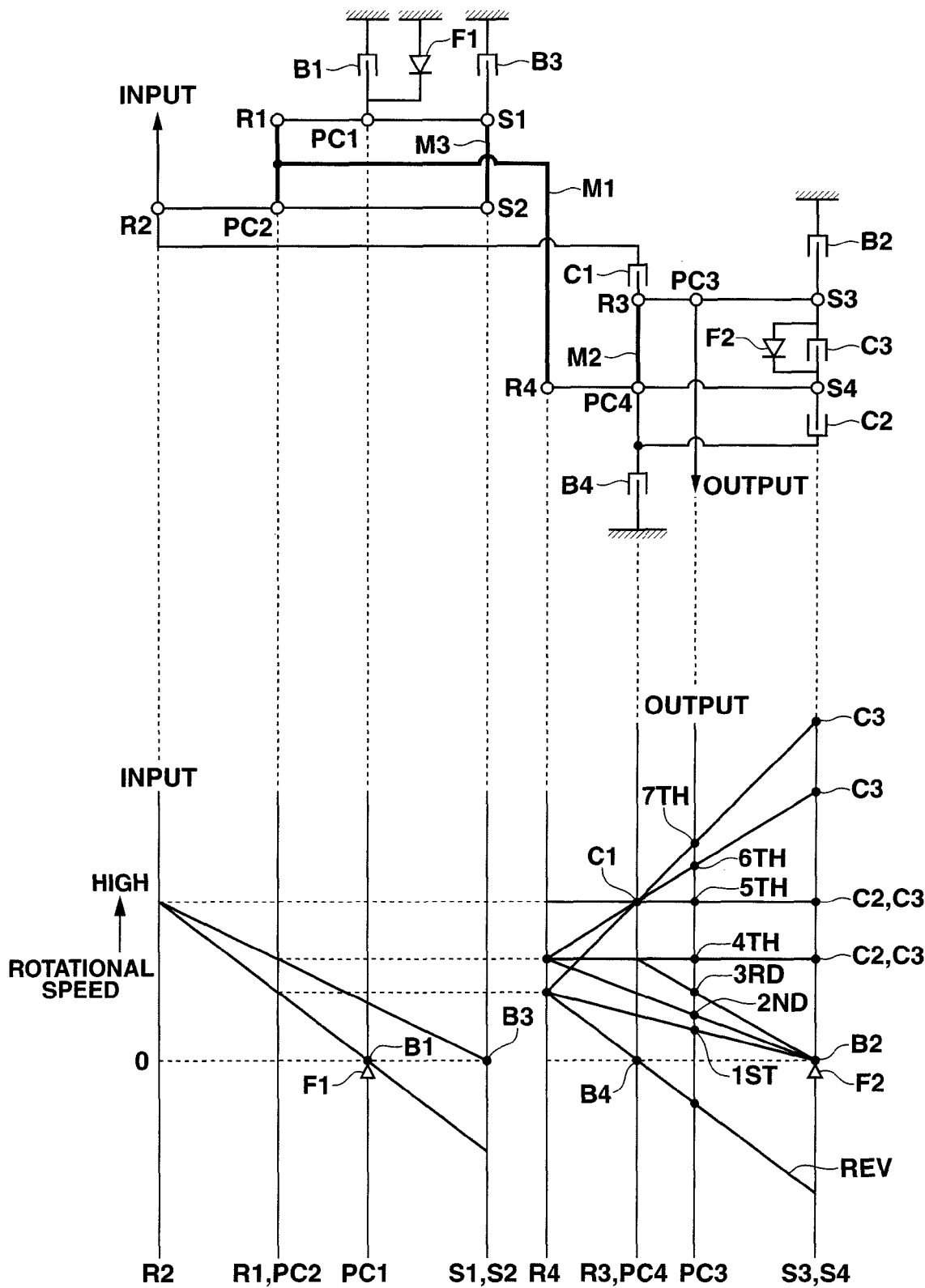
FIG. 4 is a collinear diagram showing rotational states of rotational elements for respective gear positions.

Then, the operation of the gear shift mechanism will be described with reference to FIGS. 3 and 4. FIG. 3 is a table showing whether the frictional elements are engaged or released at respective gear positions, wherein ○ indicates that the frictional element is engaged and (○) indicates that the frictional element is engaged when a gear position at which engine brake will be operated is selected. FIG. 4 is a collinear diagram showing rotational states of rotational elements for respective gear positions.

In first speed 1ST, the low brake B2, the first one-way clutch F1 and second one-way clutch F2 are engaged. Further, when engine brake is operating, the front brake B1 and the H&L clutch C3 are further engaged.

With the first one-way clutch F1 engaged, the first carrier PC1 is held stationary relative to the transmission case TC, i.e., held against rotation. The rotation inputted from the input shaft INPUT to the second ring gear R2 is reduced in speed by the first planetary gear set GS1 and outputted from the first connection member M1 to the fourth ring gear R4. Further, with the low brake B2 and the second one-way clutch F2 engaged, the third sun gear S3 and the fourth sun gear S4 are held stationary relative to the transmission case TC, i.e., held against rotation. Rotation inputted to the fourth ring gear R4 is thus reduced in speed by the second planetary gear set GS2 and outputted from the third carrier PC3.

Namely, as shown in the collinear diagram in FIG. 4, the rotation of the input shaft INPUT is reduced in speed by the first planetary gear set GS1 and further by the second planetary gear set GS2 and outputted from the output shaft OUTPUT.

In the second speed 2ND, the low brake B2, the 2346 brake B3 and the second one-way clutch F2 are engaged. Further, at the time of engine brake being operated, the H&L clutch C3 is further engaged.

With the 2346 brake B3 engaged, the first sun gear S1 and the second sun gear S2 are held stationary relative to the transmission case TC, i.e., held against rotation so that rotation inputted from the input shaft INPUT to the second ring gear R2 is reduced in speed only by the second planetary gear G2 and the rotation thus reduced in speed is outputted from the first connecting member M1 to the fourth ring gear R4. Further, with the low brake B2 engaged and the second one-way clutch F2 engaged, the third sun gear S3 and the fourth sun gear S4 are held stationary relative to the transmission case TC, i.e., held against rotation so that the rotation inputted to the fourth ring gear R4 is reduced in speed by the second planetary gear set GS2 and outputted from the third carrier PC3.

Namely, as shown in the collinear diagram of FIG. 4, the rotation of the input shaft INPUT is reduced in speed by the first planetary gear set GS1 and further by the second planetary gear set GS2 and outputted from the output shaft OUTPUT.

In the third speed 3RD, the low brake B2, the 2346 brake B3 and the direct clutch C2 are engaged.

With the 2346 brake B3 engaged, the first sun gear S1 and the second sun gear S2 are held stationary relative to the transmission case TC, i.e., held against rotation so that the rotation inputted from the input shaft INPUT to the second ring gear R2 is reduced in speed by the second planetary gear G2 and the rotation thus reduced in speed is outputted from the first connecting member M1 to the fourth ring gear R4. Further, with the direct clutch C2 engaged, the fourth planetary gear G4 is caused to rotate as an integral unit. Accordingly, the fourth planetary gear G4 participates in torque transmission but not in reduction in speed. Further, with the low brake B2 engaged, the third sun gear S3 is held stationary relative to the transmission case TC, i.e., held against rotation so that the rotation inputted from the fourth carrier C4 that rotates together with the fourth ring gear R4 to the third ring gear R3 by way of the second connecting member M2 is reduced in speed by the third planetary gear G3 and outputted from the third carrier PC3.

Namely, as shown in the collinear diagram of FIG. 4, the rotation of the input shaft INPUT is reduced in speed by the first gear set GS1, then further reduced in speed by the third planetary gear G3 of the second planetary gear set GS2 and outputted from the output shaft OUTPUT.

In the fourth speed 4TH, the 2346 brake B3, the direct clutch C2 and the H&LR clutch C3 are engaged.

With the 2346 brake B3 engaged, the first sun gear S1 and the second sun gear S2 are held stationary relative to the transmission case TC, i.e., held against rotation so that the rotation inputted from the input shaft INPUT to the second ring gear R2 is reduced in speed only by the second planetary gear G2 and the rotation thus reduced in speed is outputted from the first connecting member M1 to the fourth ring gear R4. Further, with the direct clutch C2 and the H&LR clutch C3 engaged, the second planetary gear set GS2 is rotated as an integral unit so that the rotation inputted to the fourth ring gear R4 is outputted from the third carrier PC3 as it is.

Namely, as shown in the collinear diagram of FIG. 4, the rotation of the input shaft INPUT is reduced in speed by the first planetary gear set GS1 and outputted from the output shaft OUTPUT without being reduced in speed by the second planetary gear set GS2.

In the fifth speed 5TH, the input clutch C1, the direct clutch C2 and the H&LR clutch C3 are engaged.

With the input clutch C1 engaged, the rotation of the input shaft INPUT is inputted directly to the second connecting member M2. Further, with the direct clutch C2 and the H&L clutch C3 engaged, the second planetary gear set GS2 is rotated as an integral unit so that rotation of the input shaft INPUT is outputted from the third carrier PC3 as it is.

Namely, as shown in the collinear diagram of FIG. 4, the rotation of the input shaft INPUT is outputted from the output shaft OUTPUT without being reduced in speed by the first planetary gear set GS1 and the second planetary gear set GS2.

In the sixth speed 6TH, the input clutch C1, the H&LR clutch C3 and the 2346 brake B3 are engaged.

With the input clutch C1 engaged, the rotation of the input shaft INPUT is inputted to the second ring gear R2 while at the same time being inputted directly to the second connecting member M2. Further, with the 2346 brake B3 engaged, the first sun gear S1 and the second sun gear S2 are held stationary relative to the transmission case TC, i.e., held against rotation CA so that the rotation of the input shaft INPUT is reduced in speed by the second planetary gear G2 and outputted from the first connecting member M1 to the fourth ring gear R4.

Further, with the H&LR clutch C3 engaged, the third sun gear S3 and the fourth sun gear S4 are rotated together as an integral unit so that the second planetary gear set GS2 outputs from the third carrier PC3 rotation that is determined by the rotation of the fourth ring gear R4 and the rotation of the second connecting member M2.

Namely, as shown in the collinear diagram of FIG. 4, part of the rotation of the input shaft INPUT is reduced in speed at the first planetary gear set GS1 while on the other hand being increased in speed at the second planetary gear set GS2 and outputted from the output shaft OUTPUT.

In the seventh speed 7TH, the input clutch C1, the H&LR clutch C3, the first one-way clutch F1 and the front brake B1 are engaged.

With the input clutch C1 engaged, the rotation of the input shaft INPUT is inputted to the second ring gear R2 while at the same time being inputted directly to the second connecting member M2. Further, with the front brake B1 engaged, the first carrier PC1 is held stationary relative to the transmission case TC, i.e., held against rotation so that the rotation of the input shaft INPUT is reduced in speed by the first planetary gear set GS1 and the rotation thus reduced in speed is outputted from the first connecting member M1 to the fourth ring gear R4.

Further, with the H&RL clutch C3 engaged, the third sun gear S3 and the fourth sun gear S4 are rotated together as an integral unit so that the second planetary gear set GS2 outputs from the third carrier PC3 rotation that is determined by the rotation of the fourth ring gear R4 and the rotation of the second connecting member M2.

Namely, as shown in the collinear diagram of FIG. 4, the rotation of the input shaft INPUT is partly reduced by the first planetary gear set GS1 and partly increased by the second planetary gear set GS2 and outputted from the output shaft OUTPUT.

In the reverse speed, the H&LR clutch C3, the front brake B1 and the reverse brake B4 are engaged.

With the front brake B1 engaged, the first carrier PC1 is held stationary relative to the transmission case TC, i.e., held against rotation so that the rotation of the input shaft INPUT is reduced in speed by the first planetary gear set GS1 and the rotation thus reduced in speed is outputted from the first connecting member M1 to the fourth ring gear R4.

Further, with the H&LR clutch C3 engaged, the third sun gear S3 and the fourth sun gear S4 are rotated together as an integral unit, and with the reverse brake B4 engaged, the second connecting member M2 is held stationary relative to the transmission case TC, i.e., held against rotation. Thus, in the second planetary gear set GS2, the rotation of the fourth ring gear R4 is transmitted while being reversed in the direction rotation through the fourth sun gear S4, the third sun gear S3 and the third carrier PC3 and outputted from the third carrier PC3.

Namely, as shown in the collinear diagram of FIG. 4, the rotation of the input shaft INPUT is reduced in speed at the first planetary gear set GS1 and reversed in the direction of rotation at the second planetary gear set GS2 and outputted from the output shaft OUTPUT.

The automatic transmission is constructed as described above and shifted to a desired speed among the first to seventh speeds according to a shift schedule that is determined based on the vehicle speed and throttle opening degree. In this instance, if any frictional element causes a release failure in which it is held released and cannot engage properly, a particular rotational element becomes quite higher in rotational speed as compared with the case in which the frictional element is functioning properly and particularly becomes higher than an upper limit rotational speed of the input shaft INPUT or the output shaft OUTPUT, thus possibly being lowered in the durability.

Figure 5:
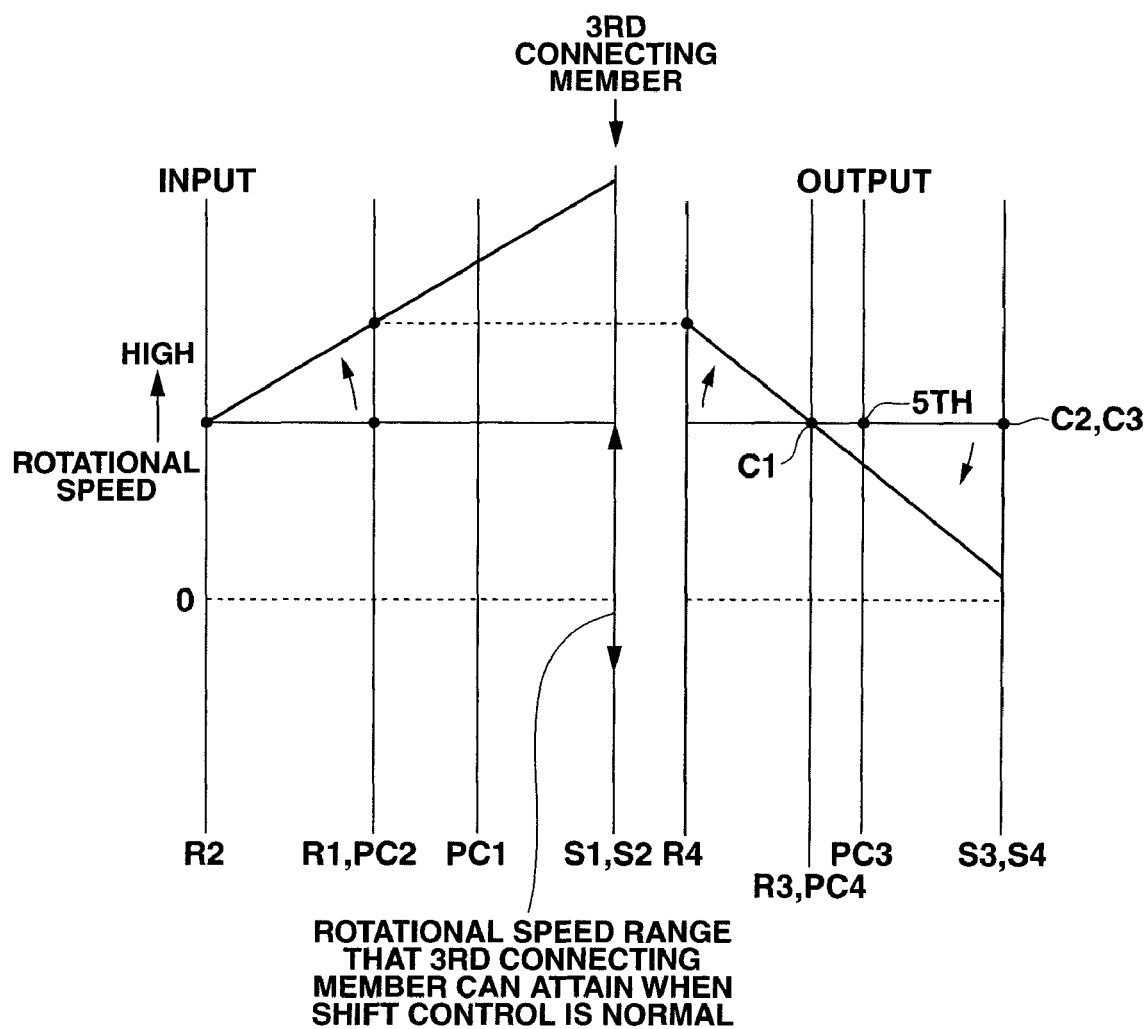
FIG. 5 is a collinear diagram showing a variation of the collinear diagram in case of occurrence of over-revolution at the fifth speed.

Referring to FIG. 5, the case where a predetermined rotational element becomes very high in rotational speed will be described. In the fifth speed, the input clutch C1, the direct clutch C2 and the H&LR clutch C3 are engaged so that the rotation of the input shaft INPUT is transmitted to the output shaft OUTPUT without being either increased or reduced in speed. In case, under this condition, a release failure in which the direct clutch C2 is held released and incapable of being engaged properly is caused, the transmission is put into a neutral state in which the power is not transmitted from the input shaft INPUT to the output shaft OUTPUT and the engine EG is not driven reversely by the driving wheels. Due to this, in the second planetary gear set GS2, the rotational speeds of the fourth ring gear R4, the third sun gear S3 and the fourth sun gear S4 are determined by the rotational speed of the input shaft INPUT (i.e., the rotational speed of the third ring gear R3) and the rotational speed of the output shaft OUTPUT (the rotational speed of the third carrier PC3). Under this condition, if, for example, an accelerator pedal (not shown) is depressed, the rotational speed of the output shaft OUTPUT becomes lower than that of the input shaft INPUT. Further, the third sun gear S3 and the fourth sun gear S4 are further reduced in the rotational speed than the output shaft OUTPUT and may, in some case, be reversed in the direction of rotation. Further, in response to this, the rotational speed of the fourth ring gear R4 is increased by a tooth ratio than that of the input shaft INPUT and becomes further higher. On the other hand, in the first planetary gear set GS1, the rotational speed of the third connecting member M3 connected to the first sun gear S1 and the second sun gear S2 is determined by the rotational speed of the input shaft INPUT (i.e., the rotational speed of the second ring gear R2) and by the first ring gear R1 and the second carrier PC2. Accordingly, the rotational speed of the second carrier PC2 connected to the fourth ring gear R4 is amplified by a tooth ratio and becomes higher than that of the input shaft INPUT. In response to this, the rotational speed of the third connecting member M3 connected to the first sun gear S1 and the second sun gear S2 is amplified by a tooth ratio as compared with the rotational speed of the input shaft INPUT and increased to such a value that cannot be caused if the frictional element is functioning properly. In the meantime, as shown in FIG. 4, it never occurs that the rotational speed of the third connecting member M3 becomes higher than that of the input shaft INPUT, if the frictional elements are functioning properly.

Further, in case, when the transmission is in the fifth speed, interlock is erroneously detected, there is also caused high-speed rotation that is not caused if the frictional elements are functioning properly. Namely, since rapid deceleration in the fifth speed due to interlock occurs in case the 2346 brake B3 or the front brake B1 is erroneously engaged, the transmission is controlled so as to release the direct clutch C2 to thereby shift the transmission to the sixth speed in case of erroneous application of the 2346 brake B3 and to the seventh speed in case of erroneous application of the front brake B1 for thereby avoiding rapid deceleration. Accordingly, in case of erroneous detection of interlock, the direct clutch C2 is released though there is not any frictional element that is erroneously engaged. The rotational speed of the third connecting member M3 is thus amplified by the tooth ratio as compared with the rotational speed of the input shaft INPUT and increased up to such a value that is not caused if the frictional elements are functioning properly, similarly to the case of a release failure of the direct clutch C2 as described above.

Figure 6:
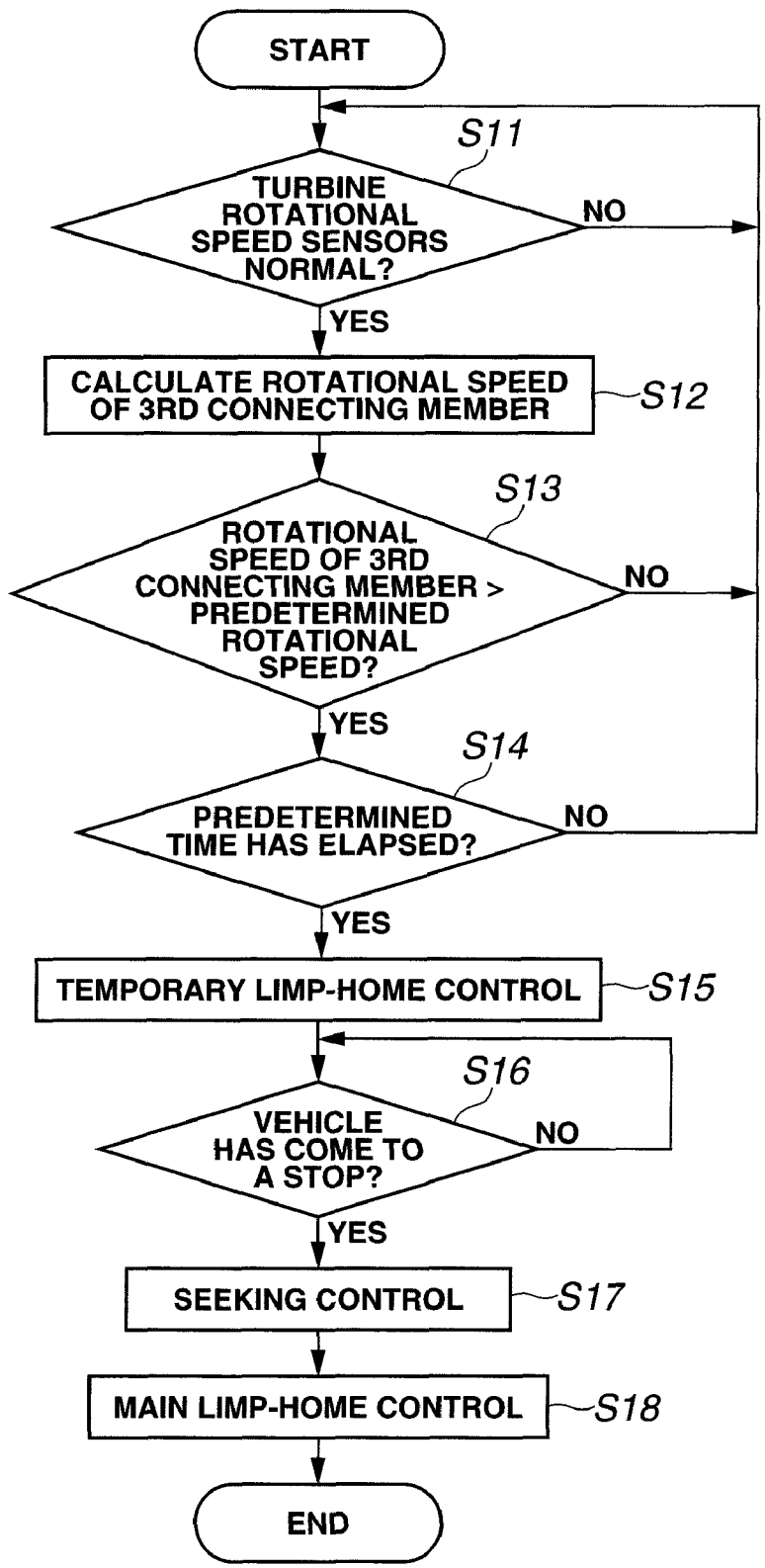
FIG. 6 is a flowchart showing a over-revolution preventing control executed in an automatic transmission control unit according to the first embodiment.

Thus, with reference to the flowchart of FIG. 6, description will be made as to the control that is executed in the ATCU 20 when such high-speed rotation as described above is caused. FIG. 6 is a flowchart depicting a control for preventing over-revolution of the automatic transmission according to the first embodiment of the present invention. In the meantime, in this embodiment, description will be made as to the case where there is caused such high-speed rotation of the third connecting member M3 that will never occur if the frictional elements are functioning properly but the following control can also be applied to the case where there is caused over-revolution of another connecting member that will never occur if the frictional members are functioning properly.

In step S11, it is determined whether the first turbine speed sensor 3 and the second turbine speed sensor 4 are normal. If the first turbine speed sensor 3 and the second turbine speed sensor 4 are both normal, the control proceeds to the step S12. On the other hand, if either one of the first turbine speed sensor 3 and the second turbine speed sensor 4 is not normal, the step S11 is executed again. The abnormality of each of the sensors 3 and 4 is determined based on, for example, whether the detected rotational speed of each of the sensors 3 and 4 at each gear position when the engine is idling is lower than a predetermined value, and when the detected rotational speed is lower than the predetermined value, each of the sensors 3 and 4 is determined abnormal.

In step S12 (rotational speed detecting section or means), the rotational speed of the third connecting member M3 (predetermined rotational element) is calculated. The rotational speed of the third connecting member M3 is calculated by the following expression (3) on the basis of the rotational speed of the first carrier PC1 that is the detection value of the first turbine speed sensor 3 and the rotational speed of the first ring gear R1 that is the detection value of the second turbine speed sensor 3.

$$N_{M3}=[(1+\lambda_1)/\lambda_1]N_{PC1}-(1/\lambda_1)N_{R1} \quad (3)$$

where $N_{M3}$ is the rotational speed of the third connecting member M3, $N_{PC1}$ is the rotational speed of the first carrier PC1, $N_{R1}$ is the rotational speed of the first ring gear R1, and $\lambda_1$ is the tooth ratio of the planetary gear G1. The tooth ratio $\lambda_1$ is the ratio between the number $Z_{S1}$ of teeth of the first sun gear S1 and the number $Z_{R1}$ of teeth of the first ring gear R1 as shown in the above-described expression (2).

In step S13, it is determined whether the rotational speed of the third connecting member M3 is higher than a predetermined speed. If the rotational speed of the third connecting member M3 is higher than the predetermined speed, the control proceeds to step S14, and if lower, the control goes back to step S11. The predetermined rotational speed is higher than a maximum possible value that the third connecting member M3 can attain when the gear position instructed by the ATCU 20 coincides with the gear position corresponding to the gear ratio that is actually realized, i.e., when a normal shift control is performed and is set at, for example, 8000 rpm in consideration of the durability of the third connecting member M3.

In step S14, it is determined whether a predetermined time has elapsed after it was determined in step S13 that the rotational speed of the third connecting member M3 was higher than the predetermined speed. If the predetermined time has elapsed, the control proceeds to step S15, and if not, the control goes back to step S11.

In step S15 (frictional element release section or means), though there is at this time a possibility of a plurality of frictional elements being engaged, a temporary limp-home control is executed to release all of the frictional elements. By this, the transmission is completely put into a neutral state.

In step S16, it is determined whether the vehicle has come to a stop. If the vehicle has come to a stop, the control proceeds to step S17, and if not, the step S16 is executed again. In the meantime, whether the vehicle has come to a stop is determined based on whether the vehicle speed is lower than a predetermined speed (e.g., 5 Km/h).

In step S17, a seeking control is executed. The seeking control is executed so as to change the instructed gear position from the first to third speed sequentially and specify a malfunctioning frictional element and its malfunctioning state on the basis of the relation between the instructed gear position and the actual gear position that is estimated from the actual gear ratio at each of the instructed gear positions. In the meantime, there are, as a malfunctioning state, a release malfunction in which the frictional element that is instructed to be engaged is not engaged completely but held released and an engagement malfunction in which the frictional element that is instructed to be released is not released but held engaged.

In step S18, a main limp-home control is executed. The main limp-home control executes a shift control for selecting, based on the malfunctioning frictional element and its malfunctioning state that are specified in step 17, a gear position that uses the malfunctioning frictional element when the frictional element is suffering the engagement malfunction and a gear position that does not use the malfunctioning frictional element when the frictional element is suffering the release malfunction.

As described above, with this embodiment, it is impossible to make a correct judgment on whether or not there exists a high-speed rotational element even if the rotational speeds of the input shaft INPUT and the output shaft OUTPUT are low, for example, in case a frictional element is malfunctioning. Thus, by indirectly detecting the rotational speed of the third connecting member M3 other than the input shaft INPUT and the output shaft OUTPUT and releasing all of the frictional elements when the rotational speed of the third connecting member M3 other than the input shaft INPUT and the output shaft OUTPUT is higher than a predetermined speed, it becomes possible to make a correct judgment on occurrence of the rotational speed of the third connecting member M3 higher than a predetermined value, and further it becomes possible to prevent the rotational speed of the third connecting member M3 from being increased by a planetary gear in case, for example, some frictional element is malfunctioning by releasing all of the frictional elements and thereby putting the transmission into a neutral state completely.

Further, since the predetermined rotational speed is set higher than a maximum possible speed that the third connecting member M3 can attain at the normal time when the gear position instructed by the ATCU 20 and the gear position corresponding to the gear ratio that is actually attained coincide with each other, it becomes possible to prevent such a surplus control that all of the frictional elements are released though the transmission is not malfunctioning.

Further, since the rotational speed of the third connecting member M3 is calculated based on the detection values of the first turbine speed sensor 3 and the second turbine speed sensor 4 that are used for calculating the rotational speed of the input shaft INPUT and a tooth ratio, the rotational speed of the third connecting member M3 that cannot be judged accurately from the rotational speeds of the input shaft INPUT and the output shaft OUTPUT can be estimated accurately. Further, since it is not necessary to provide the transmission with a new sensor for detecting the rotational speed of the third connecting member M3, increase in the cost due to increase in the parts and increase in the weight can be avoided.

Figure 7:
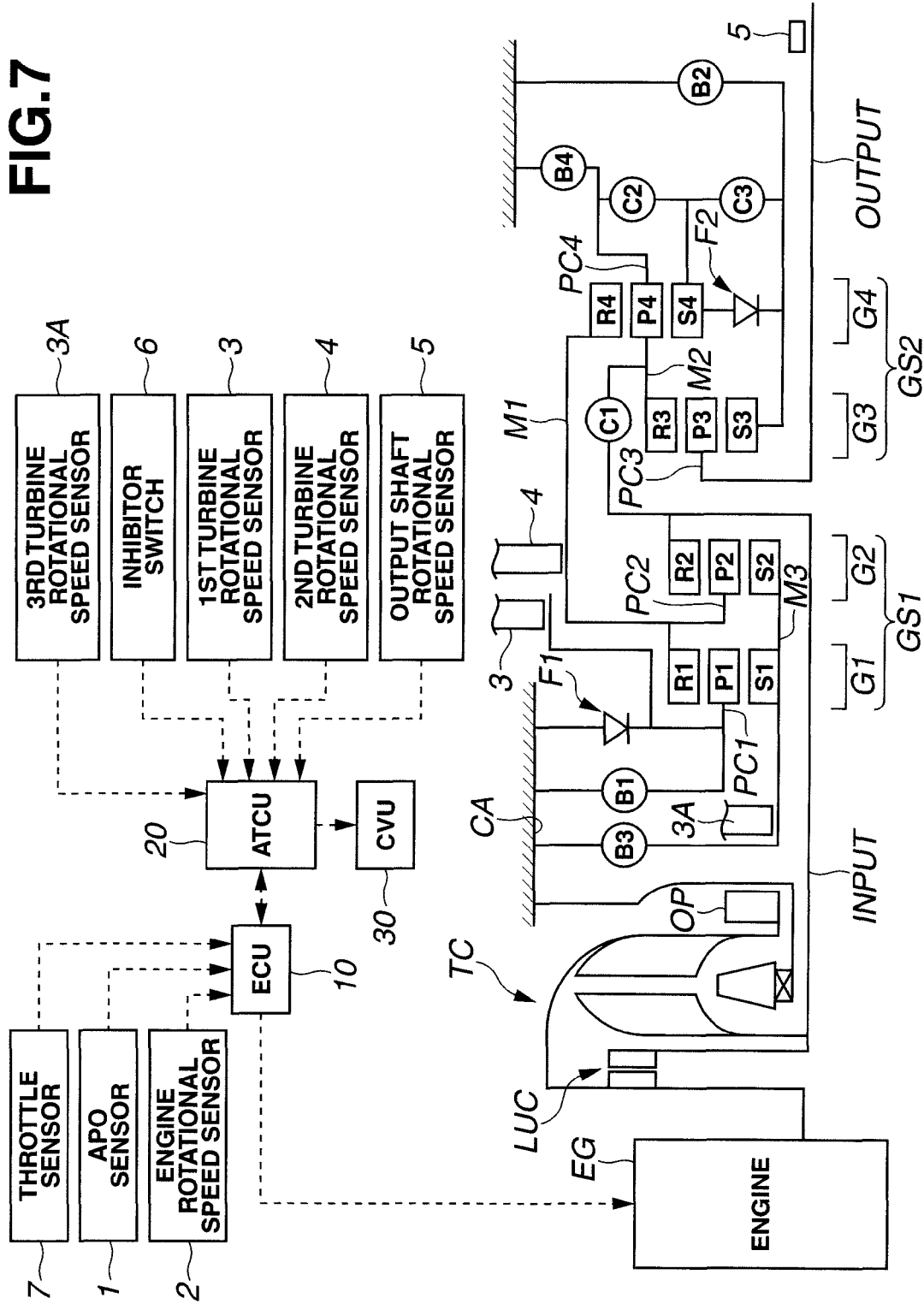
FIG. 7 is a skeleton view of an automatic transmission according to a second embodiment.

Referring to FIG. 7, a second embodiment will be described. The second embodiment differs from the first embodiment in that a third turbine speed sensor is newly provided. As shown in FIG. 7, the third turbine speed sensor 3A is disposed adjacent the third connecting member M3 and detects the rotational speed of the third connecting member M3 directly.

Figure 8:
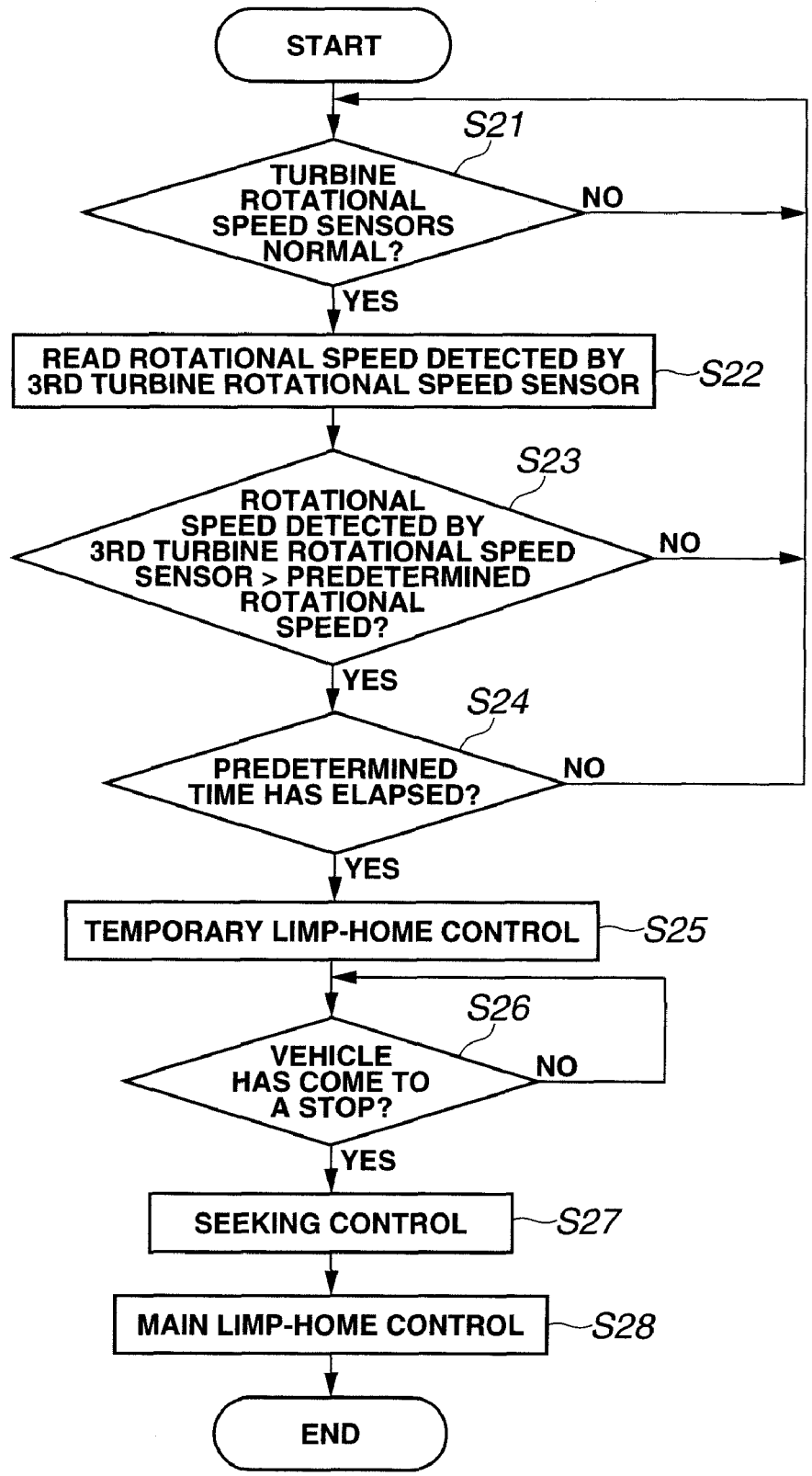
FIG. 8 is a flowchart showing an over-revolution preventing control executed in an automatic transmission control unit according to the second embodiment.

Then, the control executed in the ATCU 20 will be described with reference to FIG. 8 which shows a flowchart of a control for preventing over-revolution of the automatic transmission according to the second embodiment.

Step S21 is the same as step S11 of the first embodiment.

In step S22 (rotational speed detecting section or means), the rotational speed of the third connecting member M3 that is detected by the third turbine speed sensor 3A is read. In the meantime, in this embodiment, the rotational speed of the third connecting member 3A is detected directly so that its estimation is not necessitated.

In step S23, it is determined whether the rotational speed of the third connecting member M3 that is detected by the third turbine speed sensor 3A is higher than a predetermined speed. If the rotational speed of the third connecting member M3 is higher than the predetermined speed, the control proceeds to step S24, and if equal to or lower than the predetermined speed, the control goes back to step S21.

Steps S24 to S28 are the same as steps S14 to S18 of the first embodiment.

As described above, in this embodiment, the rotational speed of the third connecting member M3 is directly detected by the third turbine speed sensor 3A so that it is not necessary to estimate the rotational speed of the third connecting member M3 and occurrence of over-revolution can be prevented more assuredly depending upon the accurate detection value.

The entire contents of Japanese Patent Application P2007-065207 (filed Mar. 14, 2007) are incorporated herein by reference.

Although the invention has been described above by reference to a certain embodiment of the invention, the invention is not limited to the embodiment described above. Modifications and variations of the embodiment described above will occur to those skilled in the art, in light of the above teachings. The scope of the invention is defined with reference to the following claims.

What is claimed is:

1. An automatic transmission comprising:
 a plurality of planetary gears disposed between an input shaft and an output shaft and having a plurality of rotational elements;
 a plurality of frictional elements selectively engaged and released for controlling rotations and connections of the rotational elements; and
 a controller for controlling engagement and release of the plurality of frictional elements in accordance with instructions so as to realize a plurality of gear positions;
 the controller including:

a rotational speed detecting section for detecting a rotational speed of a predetermined one of the rotational elements other than the input shaft and the output shaft; and a frictional element release section for releasing all of the plurality of frictional elements when it is judged that the rotational speed of the predetermined one of the plurality of rotational elements is higher than a predetermined rotational speed.

2. The automatic transmission of claim 1, wherein the predetermined rotational speed is set higher than a maximum rotational speed that the predetermined one of the plurality of rotational elements can attain at a normal time when an instructed gear position and an actually realized gear position coincide with each other.

3. The automatic transmission of claim 1, further comprising:

first and second rotational speed sensors for detecting rotational speeds of two of the plurality of rotational elements other than the input shaft, the output shaft and the predetermined one of the plurality of rotational elements, wherein the controller further includes an input shaft rotation estimating section for estimating a rotational speed of the input shaft based on detection values of the first and second rotational speed sensors and a tooth ratio of the plurality of planetary gears, and wherein the rotational speed detecting section detects the rotational speed of the predetermined one of the plurality of rotational elements through estimation based on the detection values of the first and second rotational speed sensors and a tooth ratio of the plurality of planetary gears.

4. The automatic transmission of claim 1, further comprising a third rotational speed sensor for directly detecting the rotational speed of the predetermined one of the plurality of rotational elements, wherein the rotational speed detecting section determines the rotational speed of the predetermined one of the plurality of rotational elements based on a detection value of the third rotational speed sensor.

5. An automatic transmission comprising:

a plurality of planetary gears disposed between an input shaft and an output shaft and having a plurality of rotational elements;

a plurality of frictional elements selectively engaged and released for controlling rotations and connections of the plurality of rotational elements in accordance with instructions so as to realize a plurality of gear positions;

rotational speed detecting means for detecting a rotational speed of a predetermined one of the plurality of rotational elements, other than the input shaft and the output shaft; and frictional element release means for releasing all of the plurality of frictional elements when it is judged that the rotational speed of the predetermined one of the plurality of rotational elements is higher than a predetermined rotational speed.

6. The automatic transmission of claim 5, wherein the predetermined rotational speed is set higher than a maximum rotational speed that the predetermined one of the plurality of rotational elements can attain at a normal time when an instructed gear position and an actually realized gear position coincide with each other.

7. The automatic transmission of claim 5, further comprising:

first and second rotational speed sensors for detecting rotational speeds of two of the plurality of rotational elements other than the input shaft, the output shaft and the predetermined one of the plurality of rotational elements; and input shaft rotation estimating means for estimating a rotational speed of the input shaft based on detection values of the first and second rotational speed sensors and a tooth ratio of the plurality of planetary gears, wherein the rotational speed detecting means detects the rotational speed of the predetermined one of the plurality of rotational elements through estimation based on the detection values of the first and second rotational speed sensors and a tooth ratio of the plurality of planetary gears.

8. The automatic transmission of claim 5, further comprising a third rotational speed sensor for directly detecting the rotational speed of the predetermined one of the plurality of rotational elements, wherein the rotational speed detecting means determines the rotational speed of the predetermined one of the plurality of rotational elements based on a detection value of the third rotational speed sensor.

9. A method for preventing over-revolution of an automatic transmission including a plurality of planetary gears disposed between an input shaft and an output shaft and having a plurality of rotational elements, and a plurality of frictional elements selectively engaged and released for controlling rotations and connections of the rotational elements in accordance with instructions so as to realize a plurality of gear positions, the method comprising:

detecting a rotational speed of a predetermined one of the plurality of rotational elements, other than the input shaft and the output shaft, and releasing all of the plurality of frictional elements when it is judged that the rotational speed of the predetermined one of the plurality of rotational elements is higher than a predetermined rotational speed.

10. The method of claim 9, wherein the predetermined rotational speed is set higher than a maximum rotational speed that the predetermined one of the plurality of rotational elements can attain at a normal time when an instructed gear position and an actually realized gear position coincide with each other.

11. The method of claim 9, further comprising:

detecting, using first and second rotational speed sensors, rotational speeds of two of the plurality of rotational elements other than the input shaft, the output shaft and the predetermined one of the plurality of rotational elements; and estimating a rotational speed of the input shaft based on detection values of the first and second rotational speed sensors and a tooth ratio of the plurality of planetary gears, wherein the rotational speed of the predetermined one of the plurality of rotational elements is detected through estimation based on the detection values of the first and second rotational speed sensors and a tooth ratio of the plurality of planetary gears.

12. The method of claim 9, further comprising directly detecting, using a third rotational speed sensor, the rotational speed of the predetermined one of the plurality of rotational elements, wherein the rotational speed of the predetermined one of the plurality of rotational elements is determined based on a detection value of the third rotational speed sensor.

* * * * *